J. G. HOMAN.
ELECTRICALLY HEATED LAUNDRY IRON AND LIKE APPARATUS.
APPLICATION FILED JUNE 25, 1915.
1,172,024. Patented Feb. 15, 1916.
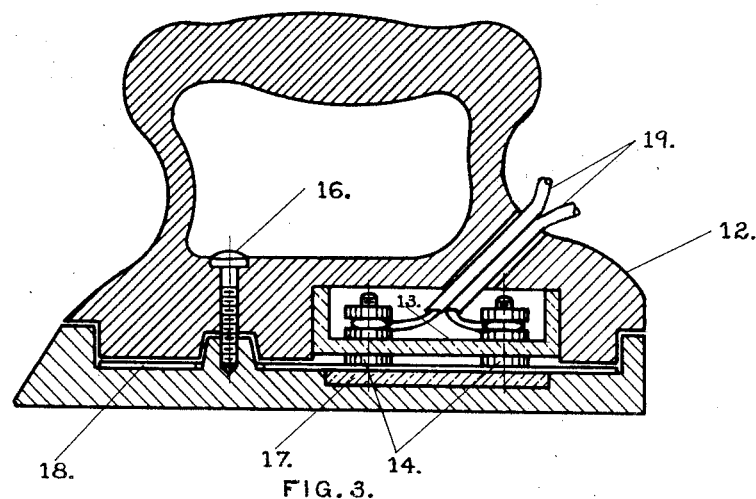
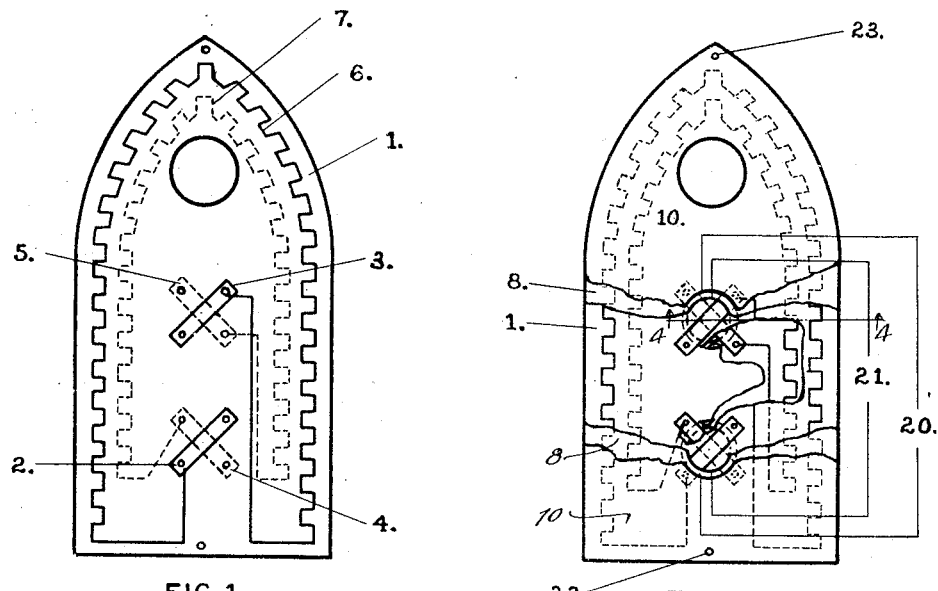
WITNESSES
INVENTOR
John G. Homan.

UNITED STATES PATENT OFFICE.

JOHN G. HOMAN, OF STEUBENVILLE, OHIO, ASSIGNOR TO SCIENTIFIC PRODUCTS COMPANY, OF NEW CUMBERLAND, WEST VIRGINIA, A CORPORATION OF WEST VIRGINIA.

ELECTRICALLY-HEATED LAUNDRY-IRON AND LIKE APPARATUS.

1,172,024.    Specification of Letters Patent.    Patented Feb. 15, 1916.

Application filed June 25, 1915. Serial No. 36,242.

*To all whom it may concern:*

Be it known that I, JOHN G. HOMAN, a citizen of the United States, residing at Steubenville, in the county of Jefferson and State of Ohio, have invented new and useful Improvements in Electrically - Heated Laundry-Irons and like Apparatus, of which the following is a specification.

My invention relates to an electrically heated flat iron or similar device having a self contained and conveniently mailable and transportable heating element or part which is protected from mechanical injury and the atmosphere. By means of my invention it is possible for the flat iron or similar device to carry a spare heater circuit protected as mentioned, which may be brought into use by an operator not necessarily skilled in mechanical or electrical science.

In many cases when the heater circuit of an electrically heated device is impaired, it is necessary to return the apparatus to expert hands for repair; entailing expense and often delay. By the use of my invention it is possible to produce an electrically heated device wherein the heating element or part containing the heater circuits, is a container of spare heater circuits, and which part is easily removed or replaced by a person of common intelligence. My invention possesses the additional virtue of producing an electrically heated apparatus whose heating element or part is of such protected form as to shield the heater circuits from excess oxidation and mechanical injury, to be conveniently mailable and cheaply constructed, and relieving the necessity of returning the iron or device to the maker for repairs of the heater circuits.

It will be discovered, upon contemplation of my invention, that it is so constructed that the heating part is electrically disengaged when the body parts of the device are mechanically separated. This being true, and because of the heating part fitting mechanically into its proper place within the body parts of the apparatus, said heating part or element may be easily replaced by simple means, or a spare heater circuit may be brought into use as desired.

By way of example, I have described in the following specification, and shown in the accompanying drawing, one embodiment of my invention, as applied to a sad-iron. It is to be understood, however, that the invention may be embodied in other forms, and that changes may be made in the embodiment shown and described, without exceeding the scope of the invention, as defined in the appended claims.

In the drawings: Figure 1 is a plan of the heating element, the top parts of the same being removed; Fig. 2 is a view similar to Fig. 1 but showing the top parts of the heating element in place, but partly broken away; Fig. 3 is a longitudinal section taken through the sad-iron; and Fig. 4 is an enlarged section taken on the line 4—4 of Fig. 2, looking in the direction of the arrows.

In Fig. 1, 1 is a mica plate upon the top side of which is secured, by eyelets, rivets or other suitable means, small metal plates 2 and 3; on the under side of the mica plate 1 similar metal plates 4 and 5 are secured by like means. From metal plate 2 to similar plate 3 a resistance ribbon 6 of suitable material is arranged and from metal plate 4 to metal plate 5 a second resistance ribbon 7 is similarly arranged; thus forming two electrical heating circuits. Over either side of the mica plate 1, which carries circuits 6 and 7, and also metal plates 2, 3, and 4, 5, I now fasten insulating and protecting plates of mica, as may be seen by reference to 8 and 9 in Figs. 2 and 4. These cover plates 8 and 9 have suitably placed holes 21 exposing portions of metal plates 2, 3, and 4, 5, as indicated.

Over the mica plates 8 and 9, I have found it useful to add extra cover plates of thin metal as is indicated by 10 and 11 in Figs. 2 and 4. These metal cover plates are insulated from the electrical circuits and serve as additional protection against harm. The plates 1, 8, 9, 10, and 11 are secured by eyelets or rivets 23. These metal covers have holes 20 corresponding with holes 21 exposing portions of metal plates 2, 3, and 4, 5, for outside connection, as may be seen from the following.

To receive the heating element above described, two or more castings or parts composing the body of the iron, are used, as indicated in Fig. 3. The top casting 12 carries a terminal block 13 of insulating material, which has arranged on its under surface, contact terminals 14 of the supply circuit 19, which are designed to engage, in electrical contact, the metal plates 2 and 3, thus energizing the heater circuit 6. If the heating element, indicated by 18 in Fig. 3, is turned up side down, the terminals 14 engage the metal plates 4 and 5 of Fig. 1 and the spare heater circuit 7 is energized.

As indicated in Fig. 3, the electrical contact of the terminals 14 with the desired heater circuits is accomplished in a satisfactory manner by mechanical pressure due to the binding action of the screw 16 which secures the body parts of the apparatus together. The terminals on the under side of the heating element or part 18 are protected if necessary by an insulating piece 17, as it is evident that under certain circumstances it might be convenient to join the plates 2 and 4 or 3 and 5 of Fig. 1, electrically.

The instance of my invention above referred to, shows but two terminals per side of the heating part but I sometimes employ more than two on either side, as may best serve the purpose desired.

I claim:

1. An electric heating device comprising a body, contacting means associated with said body, a heating element associated with said body and having a plurality of heating circuits and contacting means for each circuit, said heating element being movable to permit one or another of said second named contacting means to electrically connect with said first named contacting means, whereby one or another of said heating circuits is energized according to the position of said element.

2. An electric heating device comprising a body, an invertible heating element associated with said body and having two heating circuits, connection means for one of said circuits on one side of the element and for the other circuit on the other side of the element, and connection means associated with said body for electrically connecting with one or the other of said first named connection means according to the position of the element with respect to the body.

3. An electric heating device comprising a body, a heating element associated with said body and having two heating circuits, a pair of terminal contacts for one of said circuits on one side of said element, a pair of terminal contacts on the other side of said element for the other circuit, said pairs of contacts being disposed opposite each other, and a pair of contacts carried by said body and adapted to engage with one or the other of said pairs of terminal contacts, according to the position of the element with respect to the body.

4. An electric heating device comprising a body including an upper and a lower portion adapted to be secured together and having a chamber between them, a heating element contained in said chamber and having two heating circuits, a pair of terminal contacts for one of said circuits on one side of said element, a pair of terminal contacts on the other side of said element for the other circuit, and a pair of contacts carried by one of said body portions for engaging one or the other of said pairs of terminal contacts according to the position of said element in said chamber.

5. The combination with a device to be heated and contact means associated with said device, of a heating element mounted in said device, said heating element including an insulating base, a resistance member carried by said base, an insulating member covering said resistance member, and a relatively thin metallic plate carrying said resistance member, said base, insulating member and plate being secured together so as to form a unitary removable element, and said element having an exposed contact for an electrical connection with said contacting means.

6. A heating element comprising an insulating base, a resistance member mounted on each side of said base, separated contacts for said resistance members, and insulating cover plates secured to said base and having openings therein for exposing said contacts.

7. A heating element comprising an insulating base, a resistance member mounted on each side of said base, separated contacts for said resistance members, insulating cover plates secured to said base, and metallic protecting plates secured to said base and inclosing said cover plates, said cover plates and protecting plates having openings therein for exposing said protecting plates.

JOHN G. HOMAN.

Witnesses:
C. W. Kinter,
Jas. E. Parker.